United States Patent [19]
Van Buskirk

[11] 3,944,365
[45] Mar. 16, 1976

[54] DOCUMENT FEEDING APPARATUS AND LATCHING MECHANISM

[75] Inventor: Warren T. Van Buskirk, Rochester, N.Y.

[73] Assignee: Xerox Corporation, Stamford, Conn.

[22] Filed: June 24, 1974

[21] Appl. No.: 482,739

[52] U.S. Cl. .................................. 355/75; 355/8
[51] Int. Cl.² ................................ G03B 27/62
[58] Field of Search ............ 355/75, 47, 48, 49, 50, 355/51, 64, 65, 8; 271/273, 264, 200, 4

[56] References Cited
UNITED STATES PATENTS

| | | | |
|---|---|---|---|
| 2,250,657 | 7/1941 | Seybold | 271/200 |
| 3,218,064 | 11/1965 | Davidson et al. | 271/273 |
| 3,547,536 | 12/1970 | Phelps et al. | 355/64 |
| 3,743,406 | 7/1973 | Komon et al. | 355/51 |

Primary Examiner—L. T. Hix
Assistant Examiner—E. M. O'Connor
Attorney, Agent, or Firm—Paul Weinstein; Clarence A. Green; James J. Ralabate

[57] ABSTRACT

An apparatus for feeding individual sheets over a support surface such as a transparent viewing platen. The apparatus includes means for feeding the sheets wherein the feeding means is movable between an operable position over the surface and an inoperable position off of the surface. Latching means are provided for locking the feeding means in the operable position. Actuating means are provided for moving the feeding means between the operable and the inoperable positions, and for locking and unlocking the latching means. Means are provided operatively associated with the latching means and the actuating means for unlocking the latching means prior to movement of the document feeder off the surface. The unlocking means preferably comprises a lost motion device. A reproducing machine including the above-noted feeding apparatus is also provided.

10 Claims, 5 Drawing Figures

DOCUMENT FEEDING APPARATUS AND LATCHING MECHANISM

BACKGROUND OF THE INVENTION

This invention relates to a document feeding apparatus including a latch mechanism for locking the feeder over a transparent platen. The apparatus is particularly adapted for use in a reproducing machine.

Numerous document feeders for use with reproducing machines are known as exemplified by U.S. Pat. Nos. 3,499,710, granted Mar. 10, 1970, to Sahley; 3,556,512, granted Jan. 19, 1971, to Thackler; 3,674,363, granted July 4, 1973, to Baller, et al; and 3,790,158, granted Feb. 5, 1974, to Summers et al. These patents are representative to the broad prior art in this area directed to document feeders for placing a document on transparent viewing platen for viewing by the optics of a reproducing machine for making copies of the document. The first named patent shows the use of friction rolls for transporting the document over the platen and the remaining patents show the use of a belt type transport device.

An alternative type document feeder for use with a reproducing machine is that set out in U.S. application, Ser. No. 367,996, filed June 7, 1973, to Hoppner. In accordance with the subject application, a scanning optical system is fixed adjacent one margin of a transparent viewing platen and a document feeder is positioned overlying the optics to advance documents past the fixed optical system at a speed synchronized to the speed of an image receiving member.

Document feeders for xerographic reproducing machines have been used commercially in machines produced by Xerox and IBM. In the IBM Copier II, the document feeder mechanism is held in the feeding position by a hook type latch. When a lift handle is raised, it releases the latch allowing the document feeder mechanism to raise under spring tension. Alternatively, a solenoid is provided for automatic release of the latch after certain operations. In U.S. Pat. No. 3,642,271, granted Feb. 15, 11972, to Jones et al, a platen cover latch mechanism is described wherein a hook type latch is provided which may be released by manually depressing a button or through the use of a solenoid.

SUMMARY OF THE INVENTION

In accordance with this invention a document feeding apparatus is provided for feeding individual sheets over a transparent platen. The document feeding apparatus is movable on and off the platen preferably in a direction substantially parallel to the plane of the platen. Latching means are provided for locking the document feeder in its operative position over the platen. Means are provided for actuating said document feeder to move it on and off the platen. The actuating means is also operable to latch and unlatch the document feeder. Means operatively associated with the actuating means and the latching means are provided so that the latching means can be disengaged from its locked position prior to movement of the document feeder off of the platen.

The document feeder of this invention is particularly useful for a reproducing machine, particularly a xerographic type machine.

Accordingly, it is an object of this invention to provide an improved document feeding apparatus.

It is a further object of this invention to provide an apparatus as above including a latching means of a unique design.

These and other objects will become more apparent from the following description of the drawings.

DETAILED DESCRIPTION OF THE PREFERRED EMBODIMENTS

In accordance with this invention an apparatus is provided for feeding individual sheets over a transparent platen. The apparatus includes means for feeding the sheets over the platen wherein the feeding means at least partially overlies the platen during feeding.

The apparatus of this invention has been applied to a reproducing machine of the type set out in the above-noted U.S. application, Ser. No. 367,996. For purposes of example therefor, specific references will now be made to the reproducing machine of the aforenoted application and to the document feeding apparatus in accordance with this invention incorporated in it. While the document feeder which will be described with reference to that machine is of the type for providing a moving original type exposure system, the invention is not necessarily limited thereto. The document feeding apparatus and latch mechanism of this invention may be applied to a document feeder for a stationary original exposure system as well.

Figure 1:
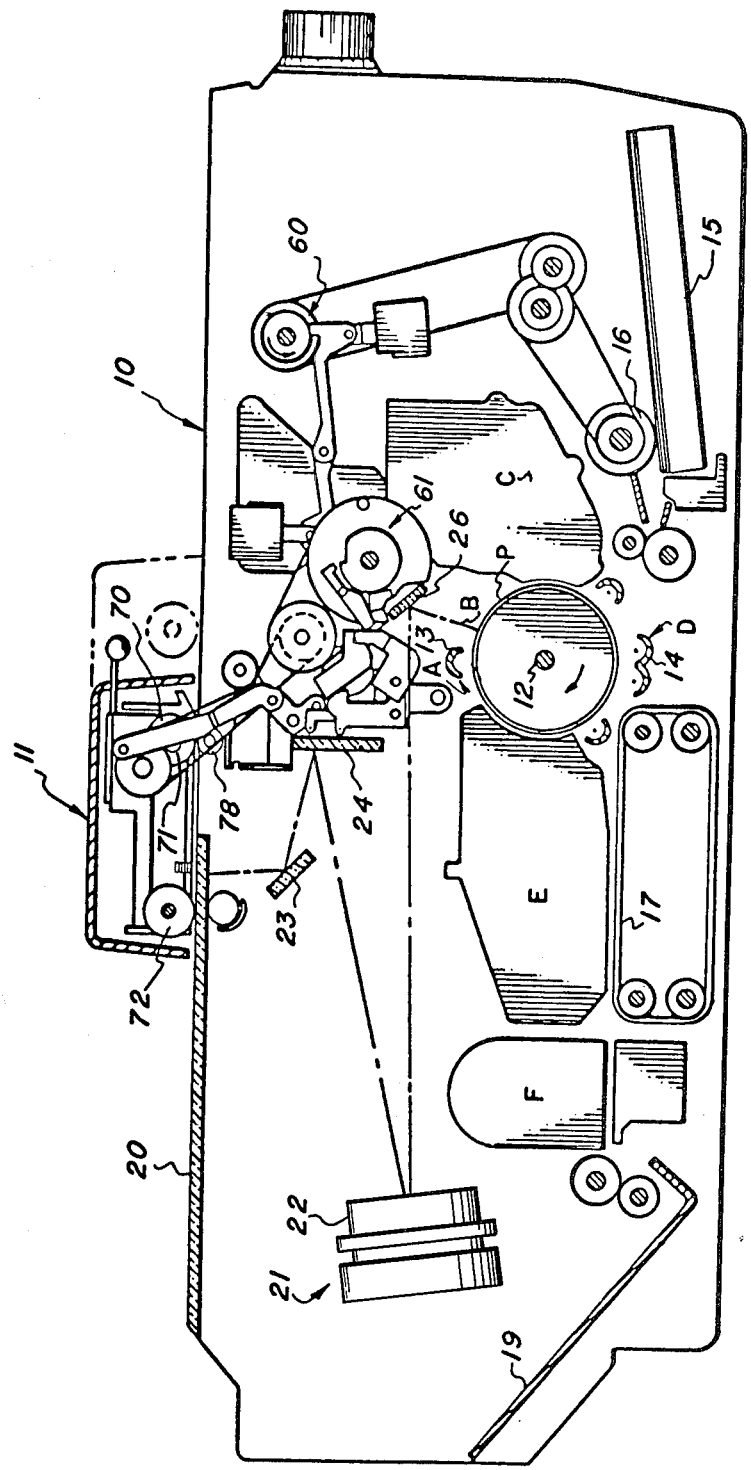
FIG. 1 is a schematic representation of a reproducing machine including a sheet feeding apparatus and latch mechanism in accordance with one embodiment of the present invention.

Referring now to FIG. 1, there is illustrated a schematic side view of a compact automatic xerographic copying machine 10 incorporating the sheet feeding apparatus 11 of the present invention. The term compact copier, as herein used, refers to a machine of relatively small size, as for example, a desk type copier. Basically, the xerographic processor includes a rotatably mounted photoconductive drum P which is supported upon a horizontally extended shaft 12. The drum is driven in the direction indicated whereby its photoconductive surface is caused to pass sequentially through a series of xerographic processing stations.

Because the xerographic process is widely known and used in the art, the various processing steps involved will be briefly explained below in reference to FIG. 1. Initially, the photoconductive drum surface is uniformly charged by means of a corona generator 13 positioned within a charging station A located at approximately the 12 o'clock drum position. The charged drum surface is then advanced into an imaging station B wherein a flowing light image of an original document to be reproduced is projected onto the charged drum surface thus recording on the drum a latent electrostatic image containing the original input scene information. Next, subsequent to the exposure step in the direction of drum rotation is a developing station C wherein the latent electrostatic image is rendered visible by applying an electroscopic marking powder (toner) to the photoreceptor surface in a manner well known and used in the art. The now visible image is then forwarded into a transfer station D wherein a sheet of final support material is brought into overlying moving contact with the toner image and the image transferred from the plate to the support sheet by means of a second corona generator 14.

In operation, a supply of cut sheets are supported within the machine by means of a removable paper cassette 15. A pair of feed rollers 16 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the rotating drum surface, as well as the other machine components through the main drive system whereby the support sheet is introduced into the transfer station in proper registration with the developed toner image supported on the xerographic plate. For further information concerning this type of sheet feeding mechanism, reference is had to copending U.S. patent application Ser. No. 205,911, filed in the name of Punnett et al.

After transfer, but prior to the reintroduction of the imaged portion of the drum into the charging station, the plate surface is passed through a cleaning station E wherein the residual toner remaining on the plate surface is removed. The removed toner particles are collected within a container where they are stored subject to periodic removal from the machine.

Upon completion of the image transfer operation, the toner bearing support sheet is stripped from the drum surface and placed upon a moving vacuum transport 17 which serves to advance the support sheet into a thermal fusing station F wherein the toner image is permanently fixed to the sheet. The copy sheet with the fused image thereon is forwarded from the fuser into a collecting tray 19 where the sheet is held until such time as the operator has occasion to remove it from the machine.

Normally, when the copier is operated in a conventional mode, the original document to be reproduced is placed image side down upon a horizontal transparent viewing platen 20 and the stationary original then scanned by means of the moving optical system 21. The scanning system 21 fundamentally consists of a stationary lens system 22 positioned below the right hand margin of the platen as viewed in FIG. 1, and a pair of cooperating movable scanning mirrors 23 and 24. The lens is basically a half-lens objective having a reflecting surface at the stop position to simulate a full lens system. The two mirrors are slidably supported between a pair of parallel horizontally alighed guide rails (not shown). For a further description and greater details concerning this type of optical scanning system reference is had to copending U.S. application Ser. No. 259,181, filed in the name of Shogren.

In practice, mirror 23, herein referred to as the full rate scan mirror, is caused to move from a home position, directly below the left hand margin of the platen to an end of scan position below the opposite margin of the platen. The rate of travel of the scan mirror is equal to the peripheral speed of the rotating xerographic drum surface P. The second mirror 24 is simultaneously caused to move in the same direction as the scanning mirror at half the scanning rate. As the two mirrors sweep across the platen surface, an image of each incremental area thereon viewed by the scanning mirror is reflected towards the second mirror which, in turn, redirects the image back to the half lens system. The reflecting surface, positioned at the lens stop position, reverses the entering light rays and redirects the light rays back towards a stationary mirror 26 positioned directly above the drum surface at the exposure station B. In this manner a flowing light image containing the original input scene information is focused upon the charged photoconductive plate.

A wind up spring (not shown) is provided to restore the moving mirrors to a start of scan condition.

The copying apparatus 10 shown in FIG. 1 is provided with a document feeder 11 in accordance with this invention. The document feeder 11 is movable between a first stored position adjacent to the viewing platen 20 and a second operative position over the platen surface. Commensurate with the positioning of the feeder assembly over the platen, the moving optical system 21 is locked in a position to view documents as they are advanced by the document feeder over the platen and record a flowing light image of the input information upon the moving photoconductive plate surface P.

Figure 2:
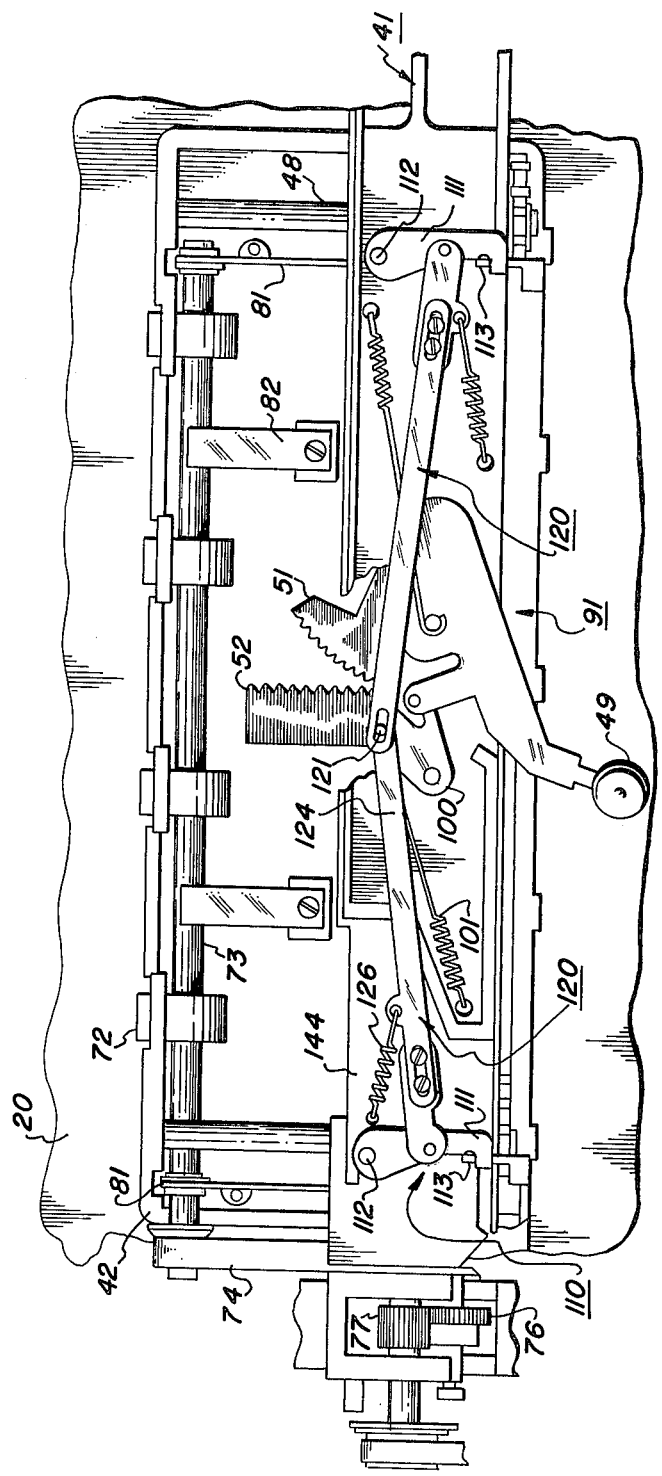
FIG. 2 is a top view of the sheet feeding apparatus and latch mechanism of FIG. 1.

Referring now more specifically to FIGS. 1 and 2, there is shown the document feeding mechanism 11 associated with the instant invention. During normal operations, that is, when the moving optics are utilized to provide a flowing light image of the stationary original, the document feeding assembly is maintained in a stored position (as depicted by the phantom lines shown in FIG. 1) to expose the entire platen surface area and thus provide a maximum working area to the operator.

To initiate the moving document mode of operation, the machine operator simply advances the document feeding assembly 11 from the stored position to a document feeding position with the feeding assembly extending over the left hand margin of the platen surface. Fundamentally, the document feeding mechanism is made up of two main sections which include a stationary support bridge, generally referenced 41, and a movable feed roller support section, generally referenced 42. The bridge 41 is made up of two vertically extending end support members which are securely anchored in the machine frame and upon which is secured a horizontal span 44. The feed roller support section 42 is slidably suspended from the horizontally extended span 44 by means of a pair of parallel aligned rod like guide rails 47, 48 which are slidably supported in bearings (not shown) affixed to the underside of the bridge span. The document feed roll assembly is thus suspended from the span so that it can be freely moved back and forth from the home or stored position adjacent to the platen 20 and an extended position over the left hand margin of the platen surface.

In practice, at the start of the moving document handling conversion cycle, the machine operator grasps a lever arm 49 mounted on top of the bridge span and rotates the arm in a clockwise direction as shown in FIG. 2. The lever arm is operatively connected to segmented pinion 51 which meshes with a rack 52 secured to the feed roller assembly 42. Movement of the arm in a clockwise direction causes the movable feed roller assembly to be advanced toward the fully extended or operative position. Rotation of the arm in the opposite direction produces the opposite result.

Manually moving the feed roller support assembly 42 to the extended position also physically closes the contacts of the large document mode switch (not shown) causing a signal to be sent to the main machine drive motor (not shown) actuating the motor. At the same time, a signal is also sent to the machine logic control system placing the machine in a single copy mode of operation. This latter step is required in order to move the optical system from its normal rest position, which is the start of scan position at the left hand end of the platen surface, to the end of scan position beneath the now fully extended feed roll assembly. However, during this initial conversion phase, no original is actually being processes and there is, therefore, no need to feed copy sheets through the copier. In point of fact, feeding a copy sheet during the conversion phase would have a deleterious effect on the various machine components as well as confusing the machine programming and registering system. To prevent this occurrence, means 60, as shown in FIG. 1, are provided for inhibiting the action of the paper feeder during the period when the machine is being converted to the moving document mode of operation. Means 61 are provided for locking the optics at the end of scan position during the moving original mode of operation. Means 61 comprises a lock-out mechanism which serves to both uncouple the drive shaft from the main drive system and hold the optics rigidly in a fixed position for viewing moving documents subsequently advanced through the document feeding assembly 11.

Further details of the inhibitor means 60 and lockout means 61 may be obtained by reference to the above-noted U.S. application Ser. No. 367,996.

The movable document feed roller support section 42 of the document feeder assembly is provided with two sets of co-axially aligned rollers comprising a first set of drive rollers 70 mounted upon shaft 71 and a second set of hold down rollers 72 mounted upon hold down shaft 73. The two roller support shafts are connected by means of a timing belt 74 whereby each set of rollers is adapted to turn in coordination with the other set of rollers. Shaft 71 is arranged to extend beyond the end wall 75 of the movable document feeder roll support section 42 and has a gear 76 pinned thereto. In operation gear 76 is adapted to move into and out of meshing contact with the stationary driven gear 77 as the document feed roll section is moved between a stored and fully extended position. When placed in a fully extended position, as shown in FIG. 2, gear 76 meshes with gear 77 thus causing both the document feed rollers 70 and the hold down rollers 72 to be rotated. Directly below the stationary bridge and adjacent to the platen margin are a set of pinch rollers 78 (FIG. 1) which are rotatably supported in the machine frame. The pinch rollers are arranged in the machine frame so as to coact with the feed rollers 70 when the document feeder 11 is in the operative position so as to advance a document introduced therebetween. In operation, the document is moved past the viewing domain of the now fixed optical assembly 21 and then into the pinch between the hold down rollers 72 and the platen 20 surface. The hold down rollers 72 serve to hold the document in sliding contact with the platen surface as the original is being moved past the optics.

The rolls 70 and 72 in the feeder 11 shown are continuously driven during machine operation even when no sheet is being fed.

Figure 3:
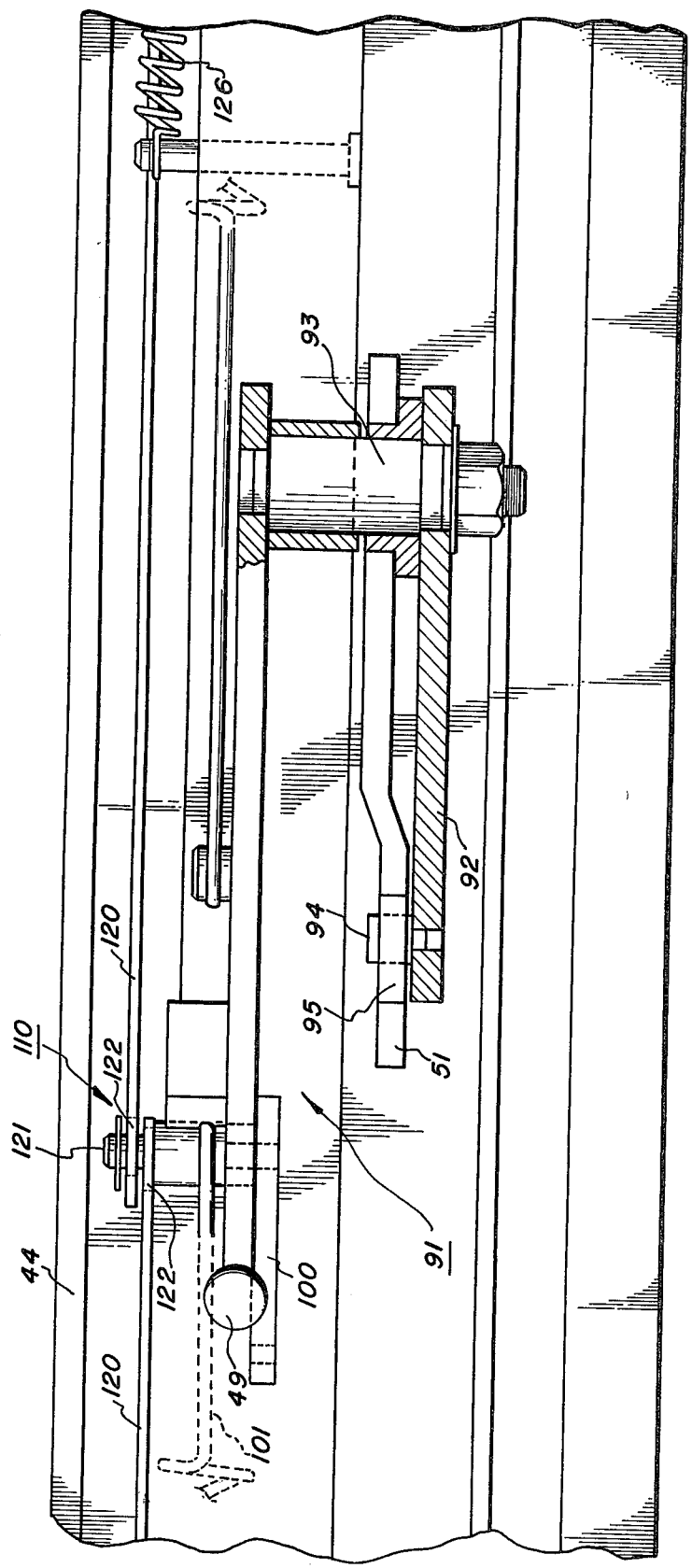
FIG. 3 is a partial side view of the sheet feeding apparatus and latch mechanism of FIG. 1.

Referring now to FIGS. 2 and 3, it is apparent that the shaft 73 which carries the rolls 72 is pivotably supported against the platen 20 by means of arms 80. The shaft 71 is journaled for rotation in the arms 80 by means of bearings 81. The arms are pivotably supported about the shaft 71. The rolls 72 are biased against the platen by means of leaf springs 82 which act upon the shaft 73. The springs 82 are mounted to the support section 42 in a cantilever fashion. The springs 82 are operative to bias the rolls against the platen with a given force normal to the platen.

The amount of the normal force which is to be applied is determined by the amount of force required to properly feed documents across the platen.

Referring now to FIGS. 2 through 4, one embodiment of a document feeder 11 and latch mechanism 90 in accordance with the present invention will be described. The latch mechanism 90 of this invention is particularly adapted for use with document feeders which move on and off the platen 20 in a sliding fashion. Document feeders such as the one shown in the Figures move in a direction which is generally parallel to the plane of the platen between a stored position off of the platen and an operative position partially or fully overlying the platen as desired.

The actuating means 91 for moving the document feeder 11 on and off the platen comprises the lever 49 which is connected to a lost motion lever 92 by means of a rotatable shaft 93 journaled for rotation in the bridge 44. The lever 92 is secured to the shaft at one end and has an upwardly extending pin 94 at its other end. The pinion gear segment 51 is rotatably supported about the shaft 93 below the bridge element 44. The pin 94 extends into a hole or slot 95 suitably positioned in the gear segment 51 to provide a lost motion means. The pinion gear 51 engages the rack 52 which is secured to the moving carriage 42.

In FIG. 2, the apparatus is shown in its operative position over the platen, pushing the lever 49 to the right will cause the pinion 51 to rotate and drive the rack 52 so as to withdraw the document feeder from the platen 20. The document feeder 11 shown in FIG. 2 is described in most respects in greater detail in U.S. application, Ser. No. 367,996. An over center cam 100 pivotably secured to the bridge 44 is employed which is spring biased by means of spring 101 to maintain the feeder in its operative position over the platen and also to maintain the meshing engagement of gears 76 and 77 which provide the drive for the rolls 70 and 72. This approach to locking the feeder in place has been found to be adequate for most useful sizes and document thicknesses being fed. It has been found, however, that for extra thick documents as, for example, documents as much as one-sixteenth of an inch thick, that the force exerted by the rolls 70 and 72 is sufficiently large and that a component thereof is directed in a direction opposite to the document feeding direction so as to partially withdraw the document feeder and disengage the mesh between the gears 76 and 77. Therefore, the drive mechanism for the feeder comprising the meshing gear 76 and 77 which are held in engagement by means of spring biasing the document feeder carriage 42 is not sufficiently reliable for use when feeding thick documents. It has been determined that a latch mechanism 110 for locking the document feeder carriage 42 in its operative position is desirable for improving feeder reliability. The latch mechanism 110 which is shown in FIGS. 2–4, is an example of a latch mechanism in accordance with the present invention. In the embodiment shown two hook-type latches 111 are provided which are pivoted about pins 112. While two latches are shown if desired, only a single latch need be employed. The use of two latches 111 provides better locking action across the feeder. The pins 112 about which the latches pivot are supported by the stationary bridge 44. A catch 113 is provided for each of the latches 111. The catches 113 are secured to the moving carriage 42. The operative portion of the catches which are engaged by the latches extend over the stationary bridge 44 when the document feeder is in its operative position over the platen. When the document feeder is in its stored position, obviously the catches are displaced from the latches by the amount of the displacement of the carriage 42.

The actuation of the latches is tied to the actuating means 91 for moving the feeder on and off the platen. Links 120 are pivotally connected to each of the latches 111 at one of their ends and are connected at their other end to the over center cam 100 by means of a pin 121 which rides in slots 122. The length of each link 120 is adjustable. Each link includes a first portion 123 which is connected to the hook-type latch 111 and a second portion 124 which is connected to the over center cam 100. A slot and screw adjustment 125 is used to secure the two portions 123 and 124 together. Therefore, the hook-type latches 111 can be adjusted so that they are securely latched when the feeder 11 is in its operable position.

The slots 122 are required in the ends of the links 110 which are connected to the over center cam 100 due to the arc through which the pin 121 travels as the cam is rotated between the position shown in FIG. 2 and the stored position. The rotation of the over center cam 100 is shown in part in FIG. 4 of this application. The slots 122 are required since as the feeder 11 is moving to its operable position the latches 111 engage and ride along the sides of the catches 113 before they can snap into locking engagement. The slots 122, therefore, provide a lost motion device for taking up the movement of the pin 121 during this portion of the latching cycle. In order to provide positive latching, springs 126 are provided to bias the links 110 so that the latches 111 will firmly engage the catches 113 in the locked position.

There is a difficulty in providing a latching mechanism for a feeder 11 as shown in FIGS. 2 through 4, which moves by sliding parallel to the platen and wherein the latching mechanism 110 is operated by the actuating means 91 for withdrawing the carriage 42. Movement of the lever 49 to withdraw the carriage 42 from its operative position over the platen while simultaneously withdrawing the latches 111 from locking engagement with the catches 113 would likely cause the latches to bind up against the catches. Therefore, a means is provided for withdrawing the latches from locking engagement with the catches prior to movement of the carriage in a direction away from the platen. This means comprises the lost motion means 92, 94, and 95. The actuating lever 49 is secured by means of shaft 93 to the lost motion lever 92 having pin 94 at one end thereof. The hole 95 is provided in the pinion gear and the pin 94 is positioned to extend into the hole. The diameter of the hole 95 is determined by the amount of rotating motion required for the lost motion lever 92 to allow withdrawal of the latches from locking engagement prior to motion being imparted to the pinion gear to withdraw the carriage 42. While a circular hole has been shown in the pinion gear, a slot could be employed if desired. The slot could have any desired shape which would be effective to carry out the operation described.

Figure 4A:
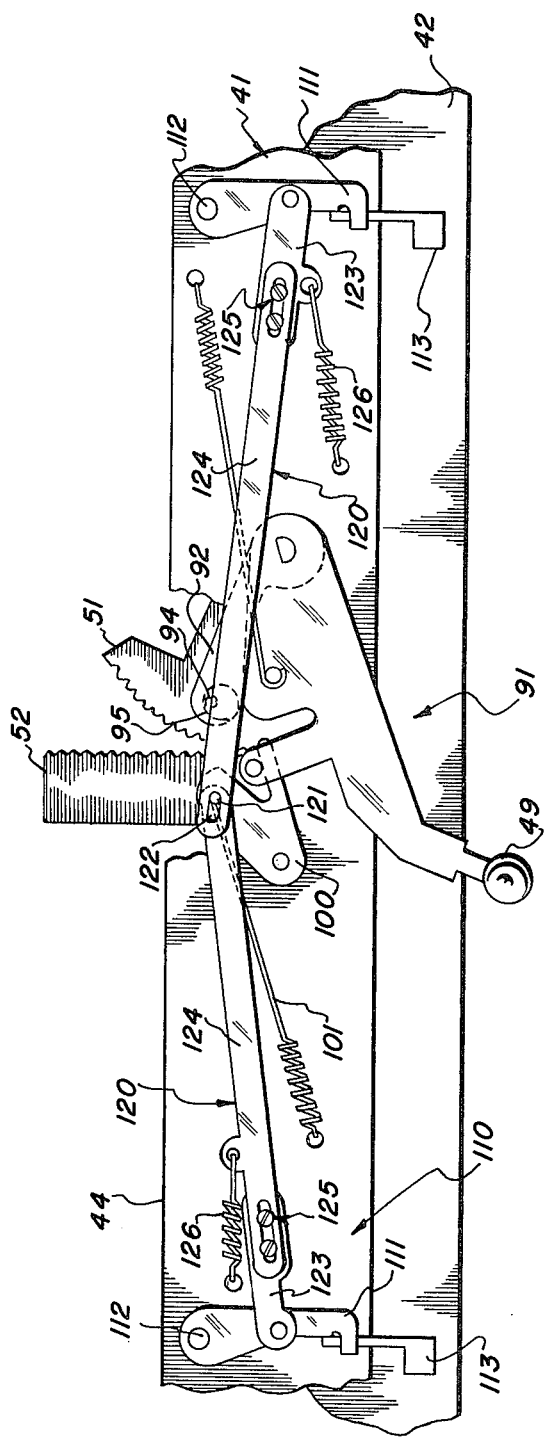
FIG. 4 is a series of top views illustrating the operation of the latch mechanism of this invention.
Figure 4B:
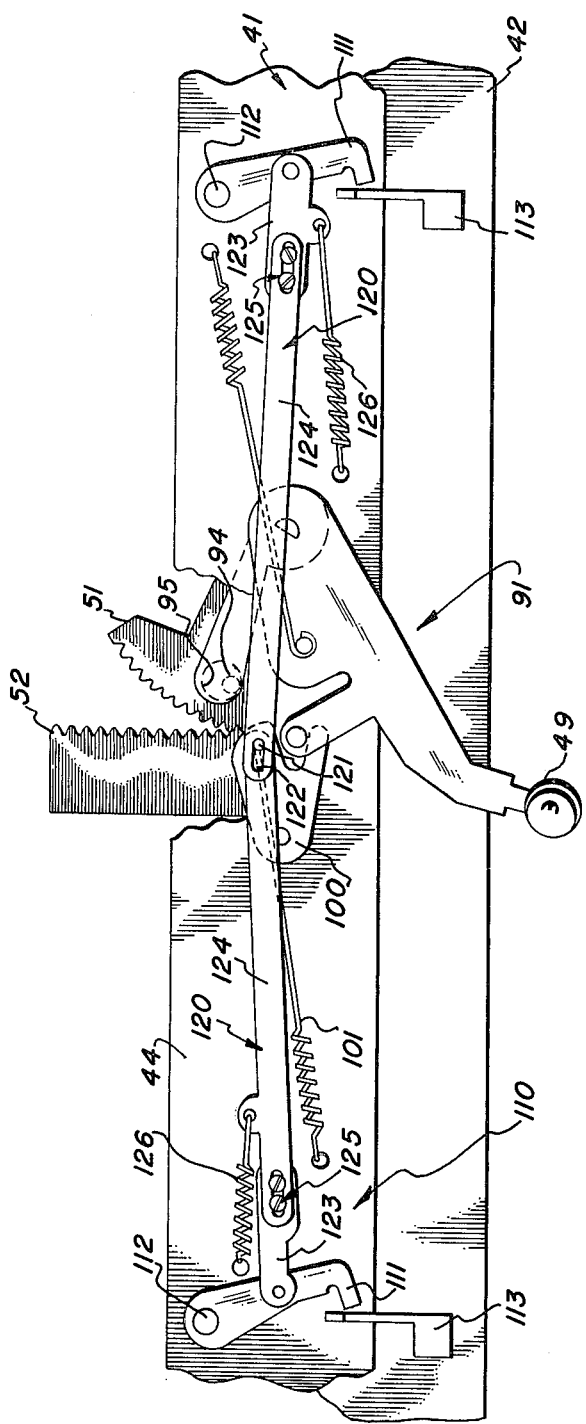

In operation, initial movement of the actuating lever causes the lost motion lever 92 to rotate through an arc so that the pin 94 which in the operative position of the carriage 42 engages one side of the hole 95 moves within the hole until it engages the opposite side of the hole. This is best illustrated in FIG. 4A and 4B. Up to this point, no movement of the carriage 42 has taken place, however, as shown in FIG. 4B, the latches 111 have been withdrawn from locking engagement with the catches 113. The withdrawal of the latches 111 took place due to the rotation of the over center cam 100 through the motion imparted to it by the pin in lever 49. The rotation of the cam 100 causes the pin 121 to engage the links 124 to move them to the right so as to pivot the latches 111 out of engagement with the catches 113. Following the operation of the lost motion means 92, 94, and 95, continued rotation of the actuating lever 49 causes rotation of the pinion gear 51 and movement of the carriage 42 off of the platen.

The particular latch mechanism described is exemplary of only one embodiment of the present invention. Other latch mechanisms could be employed.

In summary then, in accordance with this invention, a document feeder is provided which is movable on and off a transparent viewing platen for feeding individual documents over the platen. Actuating means are provided for moving the document feeder from an operative position overlying the platen to a stored position off the platen. Latching means are provided for locking the document feeder in its operative position overlying the platen. The actuating means is operative to first withdraw the latching means from locking engagement and to then move the document feeder off of the platen. Preferably lost motion means are provided between the latching means and the actuating means to enable the aforenoted unlocking of the latching means prior to movement of the document feeder. The document feeder preferably moves on and off the platen in a sliding fashion in a direction generally parallel to the plane of the platen.

The patents and applications referred to in the specification of this application are meant to be incorporated by reference into the specification.

It is apparent, therefore, that there has been provided in accordance with this invention a document feeding apparatus and latching mechanism which fully satisfies the objects, means, and advantages set forth hereinbefore. While the invention has been described in conjunction with specific embodiments thereof, it is evident that many alternatives, modifications and variations will be apparent to those skilled in the art in the light of the foregoing description. Accordingly, it is intended to embrace all such alternatives, modifications, and variations as fall within the spirit and broad scope of the appended claims.

What is claimed is:

1. An apparatus for feeding individual sheets over a support surface comprising:
    means for feeding sheets over a support surface, said feeding means being movable between an operable position over such surface and an inoperable position off of a support surface;

latching means for locking said feeding means in said operable position over such surface;

actuating means for moving said feeding means between said operable position over such surface and said inoperable position off such surface and for locking and unlocking said latching means; and means operatively associated with said latching means and said actuating means for unlocking said latching means prior to movement of said feeding means off such surface.

2. An apparatus as in claim 1 wherein said unlocking means is connected to said latching means and said actuating means.

3. An apparatus as in claim 2 wherein said unlocking means includes a lost motion means permitting said actuating means to first unlock said latching means and then move said feeding means off such surface.

4. An apparatus as in claim 3 further including such support surface wherein said surface comprises a transparent viewing platen.

5. An apparatus as in claim 4, further including means for sliding said feeding means on and off said platen in a direction substantially parallel to a plane of said platen.

6. An apparatus as in claim 5 wherein said feeding means includes a carriage member slidable on and off said platen and a stationary frame member for supporting said carriage member, and wherein said latching means includes at least one hook-type latch pivotally supported on said frame member and at least one catch mounted to said carriage member.

7. An apparatus as in claim 6 wherein said actuating means includes an actuating lever secured to a shaft mounted for rotation in said frame, a lost motion lever secured to said shaft and having a pin extending from one end thereof, a pinion gear pivotally supported about said shaft and having a hole within it for securing said pin, and a toothed rack secured to said carriage member and in meshing engagement with said gear, said pin, hole and lost motion lever comprising said lost motion means, said actuating lever being connected to said hook-type latch.

8. An apparatus as in claim 6 wherein the position of said latch relative to said catch is adjustable.

9. An apparatus as in claim 4 wherein said feeding apparatus comprises a portion of a reproducing machine for providing one or more copies of an original document wherein said platen supports original documents, and wherein said machine further includes a moving photosensitive surface, means for projecting an image of said document on said photosensitive surface and means for developing said image.

10. An apparatus as in claim 9 wherein said feeding means moves said document in synchronism with said photosensitive surface and said image is projected from said moving document.

* * * * *